3,019,220
ISOLATION OF SAPOGENINS

Percy L. Julian, Oak Park, Ill., assignor to The Julian Laboratories, Inc., Franklin Park, Ill., a corporation of Illinois
No Drawing. Filed July 17, 1958, Ser. No. 749,066
15 Claims. (Cl. 260—239.55)

This invention relates to improvements in the method of isolating steroidal sapogenins and more particularly it relates to the isolation of diosgenin from plant material of the species Dioscorea.

Diosgenin is readily convertible by known means into 5,16-pregnadien-3$\beta$-ol-20-one, and related sapogenins are similarly convertible into the corresponding 16-dehydropregnan-20-ones. These 16-dehydro compounds serve as convenient starting materials for a number of valuable steroid hormones, such as progesterone, estrone, testosterone, Reichstein's substance "S," cortisone acetate and the like.

Procedures for the large-scale isolation of diosgenin and related sapogenins as presently proposed or practiced are inefficient, laborious and time consuming. For example, in the recently proposed process disclosed in Canadian Patent 506,827, the sapogenins are obtained by first extracting the saponin with hot water for a period of between 15 and 20 hours and thereafter hydrolyzing the extract with a non-oxidizing mineral acid. In our experience, it has been found that in addition to the time-consuming extraction step required, severe foaming problems are often encountered and although particular care is exercised, difficulty separable slimes result. Further, unless the cellular structure of the plant material is completely disintegrated, the efficiency of the extraction process leaves much to be desired. In fact, the extended time cycle suggested in this phase of the process is due in part to the difficulty experienced in leaching out the saponins, leastwise, in batch process, from the plant source material. The foaming problems occasioned by this extensive heating of saponin solutions, together with the high fuel costs, capacity limitations, and inevitable poorly filterable slimes combine to militate against the large-scale commercial utilization of this proposed procedure.

The older methods, based on the original work of Marker et al. involve, among other things, a number of steps, and the use of large volumes of organic solvents. In these older methods, in general, the plant material is collected, cleaned, and then sliced into thin strips. These strips are dried usually by exposure to the sun, and thereafter the dried strips are pulverized by hand. The resultant pulverized mass contains a relatively high proportion of fines which must be separated from the granular portion of the mass. The granular portion is extracted, e.g. by percolating a low boiling organic solvent, e.g. alcohol, through the solid to remove the sapogenin glycosides. (The fines are often admixed with sawdust or other suitable carrier and separately extracted also with alcohol). The alcohol extract, after separation from the insoluble residue, is concentrated to a syrup to which an acidic hydrolyzing agent, e.g., hydrochloric acid is added. After hydrolysis of the glycosides, the mixture is diluted with water to precipitate a crude sapogenin-containing mixture, which is separated (usually with difficulty due to its slimy physical character) and dried. This so-called "brown powder" amounting to about 15 percent of the plant material (and containing about 20 percent of sapogenin) is thereafter extracted with a suitable organic solvent to recover therefrom the sapogenin which, after intensive purification, is finally achieved in a state suitable for conversion to the 16-dehydropregnenolone or 16-dehydropregnanolone.

From this brief description of the currently used procedure for the isolation of sapogenins such as diosgenin from plant sources, it can be seen that the process involves the use, recovery, and rectification of alcohol. The efficiency of the recovery is of importance since in view of the large volumes used, relatively small percentage losses can adversely affect the economic success of the process. Further, the nature of the dried material is such that the extraction step is not so efficient as could be desired, while on the other hand, the finer the source material extracted, the greater is the difficulty experienced in efficiently separating the extract from the residue due to clogging of the separation medium. It is, therefore, a prime object of my invention, to simplify and to improve the isolation of sapogenins from plant material.

It is a further object of my invention to devise a process for the isolation of diosgenin and related sapogenins from plant material containing them which does not involve the step of extracting the dried pulverized plant material with alcohol.

Another object is to devise a process for the isolation of sapogenins from plant material which does not include a step of separating hydrolyzed plant material by filtration or analogous means.

Other objects will be obvious from the following description of my invention.

I have now found that the sapogenins can be efficiently and readily isolated from plant material containing them by a process containing the following sequence of important steps:

(a) Freshly gathered saponin-containing material is sliced, dried and comminuted or alternatively, the fresh ("green") material can be comminuted and then, if desired, dried.

The latter procedure is generally preferable since the tender condition of the "green" material lends itself admirably to comminution. Further, this more preferable manner of initially disintegrating the plant fibrous structure results in material substantially free from fines;

(b) The ground material, either dried or wet, is then heated with dilute aqueous mineral acid for a period sufficient to effect substantially complete hydrolysis of the saponin;

(c) Thereafter, the entire liquid slurry of hydrolyzed plant material and aqueous acid is heated and agitated with a suitable non-miscible organic solvent to effect the extraction of the freed sapogenin from the total hydrolysis mixture. Preferably the liquid slurry is neutralized by the addition of a base, such as caustic soda, soda lime, soda ash and the like prior to extraction. The solvent separates readily from the aqueous portion and is easily drawn off from the mixture. The extraction procedure is repeated several times to insure complete removal of the sapogenin;

(d) The solvent is removed either by steam distillation or by direct evaporation to effect the isolation of the diosgenin in a commercially usable form.

It will be readily apparent from the above general description of my improved process, that the detrimental effect of fines resulting from comminution of the plant material has been obviated. In the prior art procedures involving a percolation step in which the comminuted plant material acted as the filter bed, the fines, unless separated, acted to plug the porous mass and thus to impede the flow of solvent. In this new procedure, the fines, if any, in the presence of the larger particles, are strained from the solvent and carried into the aqueous phase in the extraction step and hence the deleterious effect of fines has been obviated and rendered of no consequence.

Further, I have made the surprising discovery that the total hydrolysis mixture can be advantageously extracted with various water immiscible organic solvents. By so doing, the exceedingly difficult, if not impossible, filtration of the hydrolysis mixture to effect the separation of the liquid from the solid portions of said mixture is rendered unnecessary, especially on large-scale applications. The plant material during hydrolysis disintegrates to yield a considerable portion of a finely divided slime or mud. This mixture is extremely difficult to filter or otherwise separate on a laboratory scale and impossible to effectively separate on a larger scale. The costly, time-consuming operation of filtration of the finely divided slime produced during the hydrolysis step, I have found, can be eliminated by the process of my invention, in which the total hydrolyzed mass is subjected to a solvent extraction. Thus, by my invention, the process of isolating sapogenins has been greatly improved and simplified.

The isolated sapogenin obtained in my process, though less in weight than the crude brown powder usually obtained by the prior art extraction process, contains about 70 percent or more of the sapogenin.

When a solvent like trichloroethylene is used for the extraction, steam distillation of the extract to free it from solvent, leaves behind granular crystalline powder, which will contain from 50 to 70 percent of sapogenin, depending upon the oil and wax content of the original plant material. This material can readily be filtered, washed with hot water, and dried to a commercially usable crude diosgenin. It can be stored and kept indefinitely. Pure diosgenin can be obtained from this steam distillation residue by recrystallization from solvents like heptane, isopropanol, etc.

When a hydrocarbon solvent like heptane is used, the isolated sapogenin is readily obtained directly in a high state of purity. The oils and waxes, which are extracted from the hydrolysis mixture along with the sapogenin are, for the most part, retained in the mother liquor left after crystallization of the diosgenin from a solvent such as heptane. In this manner, direct extraction with heptane, concentration and crystallization, can give a diosgenin of at least 90% purity.

The process of my invention makes possible the recovery of better than 75 percent of the available sapogenin available in the plant material. From high quality root, this process provides yields of diosgenin amounting to between 6 and 10 percent based on the weight of the plant material extracted.

I have made the further surprising discovery that this crude sapogenin can be used directly for the production of 16-dehydropregnenolone and related substances. By contrast, the so-called "brown powder" which is obtained in yields of about 15 percent from the plant material requires extensive extraction and purification prior to being amenable to further processing to 16 - dehydropregnenolone, since the "brown powder" usually contains only about 20 percent of diosgenin. Such a crude product, it is well known, requires extensive refining prior to conversion to 16-dehydropregnenolone.

The following examples will illustrate the process of my invention:

*Example I*

To 300 ml. of hot (95° to 98° C.) 6% aqueous hydrochloric acid, 100 g. of dried *Dioscorea barbasco* amarillo root, containing about 5% moisture, was added and the mixture was heated under reflux for about 2 hours. The flask was shaken intermittently to dissipate the froth which appeared, but otherwise was undisturbed during the heating period. Thereafter, the pH of the mixture was adjusted to about 6 by the addition of 50% aqueous caustic soda and to the mass was added 200 ml. of trichloroethylene. The resulting slurry was heated to and maintained boiling under reflux conditions for 30 minutes. The hot slurry was permitted to separate into layers. The solvent layer was drawn off and the aqueous portion extracted three additional times with 200 ml. portions of trichloroethylene.

The extracts were combined and then the solvent distilled with steam. The resultant slurry of granular crystalline solid was filtered from the hot mother liquor and washed with 100 ml. of hot water. The washed cake, after being dried to constant weight, weighed 8 g.

The crude product so obtained on being recrystallized from heptane or isopropyl alcohol gave 5.7 g. of pure diosgenin, M.P. 201–03° C., indicating that the crude product obtained above contained a minimum of 71 percent of diosgenin.

A 100 g. lot of dried hammer milled *Dioscorea barbasco* amarillo root was treated in a similar manner and yielded 9.36 g. of crude diosgenin, which upon recrystallization from heptane gave 6.59 g. of pure diosgenin.

In an analogous manner, the *Dioscorea barbasco* amarillo was replaced by *Dioscorea barbasco* rosado, and by *Dioscorea cabeza*. Equivalent results were obtained.

*Example II*

A slurry of 100 grams of finely chopped dried green Yucca leaves, containing 2.4% moisture in 300 ml. of 6% aqueous hydrochloric acid was heated under reflux conditions for about 2.5 hours. After adjustment of the pH of the slurry to 6.5, 200 ml. of trichloroethylene was added and the mixture was boiled under reflux for 30 minutes. The mass was permitted to separate into layers and the solvent layer was drawn off. The aqueous portion was extracted three additional times with 200 ml. portions of trichloroethylene.

The extracts were combined and the solvent distilled therefrom with steam. The solvent free slurry of crude sapogenin was filtered and washed with hot water. The washed cake was dried to constant weight, 8.75 g.

This crude product was recrystallized from heptane and yielded 5.15 g. of sarsasapogenin.

*Example III*

Freshly gathered *Dioscorea barbasco* amarillo root was hammer milled and dried to about 8 to 10% moisture content. The resulting material, assaying 6.12% diosgenin content, was hydrolyzed by refluxing 800 pounds of dried root in 1600 pounds of 6% by weight of aqueous hydrochloric acid. After 2 hours of refluxing, the mass was cooled slightly and then by the addition of 50% aqueous caustic soda, neutralized to pH of 6. To the resultant mass 2500 pounds of heptane were added and the mixture was heated to and maintained at its boiling point for one-half hour. The mass was permitted to cool and to stratify, the solvent layer was removed by decantation, and replaced with a similar volume of fresh solvent. The mixture was again heated to boiling under reflux and maintained thereat for one-half hour. The mixture was permitted to cool and to stratify, the solvent layer was decanted and replaced with an equal amount of fresh solvent. The extraction procedure was repeated for a third and a fourth time. Thereafter, the solvent extracts were combined and concentrated to about 2000 pounds. The mass was refluxed for about 1 hour and then clarified by filtration. The filtrate then was concentrated to a thick slurry, cooled to about 25° C. and filtered. The filter cake was washed with cold heptane and finally with cold hexane. The washed cake was dried and the resultant grayish buff material amounting to 6% yield melted at 195–200° C. The crude diosgenin obtained in this example was converted by known means directly into 16-dehydropregnenolone acetate in excellent yield.

In a similar fashion, hammer milled and dried *Agave tourmeyana* was hydrolyzed and extracted to obtain therefrom crude diosgenin of 94% purity, which was suitable for conversion to 16-dehydropregnenolone acetate.

Example IV

One part of comminuted "green" *Dioscorea barbasco amarillo* root was mixed with 2 parts by volume of 10% aqueous hydrochloric acid and the mixture heated to and maintained refluxing for 2 hours. The mass was cooled slightly and neutralized with aqueous caustic soda to a pH of about 5.5. Thereafter, 2 parts by volume of trichloroethylene was added and the mixture was refluxed for one-half hour. The mass was permitted to stratify, the solvent layer separated, and fresh solvent in amount equal to that decanted added to the hydrolysis mixture. This extraction procedure was repeated until a total of four extractions had been carried out. The decants were combined and the solvent was removed by steam distillation. The aqueous slurry of the crude sapogenin was filtered and dried in a circulating hot air drier. The dried product melted at 175–85° C. Upon recrystallization from heptane, pure diosgenin, M.P. 201–04° C. was obtained. The crude product is suitable for conversion by known means, to 16-dehydropregneneolone acetate.

From the above examples, it can be readily seen that a general procedure has been devised for the obtaining of sapogenins from plant material in which these valuable steroidal compounds occur, usually in the state of glycosides.

It is of particular importance and certainly such represents a most surprising feature of my invention to observe that by eliminating the difficult and often time-consuming filtration step following the hydrolysis, the extraction of the total hydrolysis mixture enables one to recover the sapogenin efficiently and with facility. This could hardly be expected and assumed in the case of a substance like diosgenin, which is so little soluble (1 part pure diosgenin in 70 parts heptane). The reason, therefore, resides in solubilizing extent of impurities in the hydrolyzed mass. First extract removes substantially all of the available sapogenin together with the "solubilizing" impurities. Furthermore, the equipment required to carry out this improved process has been simplified and the time cycle shortened by the elimination of the time-consuming filtration step.

Numerous variations in the details of the illustrated procedures of the above examples will be apparent to those skilled in this art. For example, the hydrolysis can be effected at any convenient temperature, preferably above 70° C. and especially between about 95° and the boiling point of the hydrolysis mixture. The hydrolysis reaction can be effected at slightly elevated pressures if desired. The optimum time of the hydrolysis will, of course, depend to the largest extent upon the temperature. In general, I have found that a period of about 2 hours at about 90° C. produces the maximum yield of sapogenin.

Among the water immiscible solvents or mixtures thereof which can be used for the extraction of the sapogenin from the hydrolysis mixture are those selected from either the class of hydrocarbon solvents or halogenated hydrocarbon solvents, which are liquid at ambient temperatures, i.e. about 25° C. In the former class, I have found that those containing at least 5 and less than 10 carbon atoms, and especially hexanes and heptanes and octanes are to be preferred. Among the liquid halogenated hydrocarbons, those containing from 1 to 5 carbon atoms and 1 to 4 halogen atoms are to be preferred. Especially useful are heptane and trichloroethylene.

The hydrolyzing medium is acidic in character and I have found that any mineral acid, preferably non-oxidizing in character, can be used. Hydrochloric acid is most conveniently employed, although other halogen acids, sulfuric acid, phosphoric acid and the like are satisfactory. The acid solution should be dilute and I have found that acid concentrations of between about 5% and 30% by weight are generally useful; the lower limit being that at which the hydrolysis is not inordinately slow and the upper limit being that which does not cause excessive sapogenin decomposition. Together with a temperature of 95° to 98° C. and a time of 2 hours, I usually prefer to use a hydrochloric acid concentration of 6% by weight.

It will be readily apparent to those skilled in the art, that the acid solution should be sufficient initially at least to completely wet and immerse the plant material and sufficient to dissolve and hold in solution the sugars resulting from the hydrolysis of the saponin. Too large a volume is not desirable since such would increase the consumption of heat and problems attendant upon the handling and disposal of large amounts of effluent waste liquors. The selection of the amount of acid liquid to be used will be within the skill of the trained artisan.

The hydrolyzed mass, prior to extraction, may be neutralized if desired. However, such is not necessary since I have found that the extraction can be efficiently carried out in acid or neutral media. Further, when operating in equipment not of glass, in order to minimize the corrosion problems, I prefer to neutralize the acid hydrolyzed mass. As a matter of safety, that is to avoid possible danger to personnel from splashing of acidic solutions, it is preferable at the end of the hydrolysis period to adjust the pH of the solution to between about 5 and 7.

I have found that the process of my invention is suitable for use with any sapogenin glycoside containing plant material. Among the preferred genera, such plants as those belonging to the family of Dioscorea can be mentioned. Of the many plants belonging to this family, the following species are typical of those which are suitable as starting materials in this process: *Dioscorea barbasco amarillo, Dioscorea barbasco rosado, Dioscorea barbasco novado, Dioscorea cabeza, Dioscorea florabunda, Dioscorea Tokoro, Dioscorea gracillima*. The plants can be used fresh (green) or dried and equivalent results are obtained from either. The plant material is prepared by cleaning and then comminuting, e.g. in a hammer mill. When "green" material is used, the juices which may be expressed during the comminuting process are collected and added to the hydrolyzing medium.

I have found that the novel process described and illustrated above is surprisingly more effective and economical than prior processes known to me. It is a distinct advantage of this process to obtain a crude sapogenin without the extensive purification required by the prior process and without resort to difficult and time-consuming filtration of the hydrolysis mixture, which sapogenin is suitable directly for the efficient production of valuable steroidal derivatives.

Wherein the above description and in the appended claims reference is made to a hydrocarbon solvent such as heptane, it is intended to include not only the chemical entity, e.g. N-heptane, but mixtures of hydrocarbons commercially available under various trademark designations boiling within the range of such hydrocarbons. These mixtures usually contain more or less of the chemical entity referred to, but in addition to having its boiling range, also approximate its solvent characteristics.

My invention has been disclosed and described in the above specification and illustrative examples. Various modifications in the disclosed procedures will be readily apparent to those skilled in the art, and said modifications are included within the scope of my invention, which is only limited by the appended claims.

Having described my invention, what I claim is:

1. The process which comprises the steps of hydrolyzing steroidal sapogenin glycoside-containing plant material with dilute aqueous mineral acid, extracting the steroidal sapogenin from the total hydrolysis mixture with a water immiscible organic solvent selected from the group consisting of liquid hydrocarbon solvents having from 5 to 10 carbon atoms and liquid halogenated hydrocarbon solvents having from 1 to 5 carbon atoms and from 1 to 4 halogen atoms and recovering the steroidal sapogenin from the extract of the total hydrolysis mixture.

2. The process of claim 1 in which the hydrolysis step is conducted at a temperature above 70° C.

3. The process of claim 1 in which the plant material is of the species Dioscorea and the sapogenin obtained is diosgenin.

4. The process of claim 3 in which the hydrolysis step is conducted at about 90° C. and for a period of about 2 hours.

5. The process of claim 4 in which the total hydrolysis mixture is rendered less acidic by the addition of an acid binding material selected from the group consisting of caustic soda, soda lime and soda ash to a pH range of from pH 5 to pH 7 prior to the extraction of said mixture with the water immiscible solvent.

6. The process of claim 4 in which the water immiscible solvent is trichloroethylene.

7. The process of claim 4 in which the water immiscible solvent is heptane.

8. The process of isolating steroidal sapogenins from steroidal sapogenin glycoside-containing plant material which comprises the steps of comminuting the plant material, heating the comminuted plant material admixed with dilute aqueous mineral acid at above about 70° C. to effect substantially complete hydrolysis of the glycosides, extracting the freed steroidal sapogenins from the total hydrolysis mixture with a water immiscible organic solvent selected from the group consisting of liquid hydrocarbon solvents having from 5 to 10 carbon atoms and liquid halogenated hydrocarbon solvents having from 1 to 5 carbon atoms and from 1 to 4 halogen atoms, separating the solvent solution of the steroidal sapogenin from the total hydrolysis mixture and recovering the steroidal sapogenin from the said solvent solution.

9. The process of claim 8 in which the plant material is of the species Dioscorea and the sapogenin is diosgenin.

10. The process of claim 8 in which the plant material is the Yucca leaf and the sapogenin is sarsasapogenin.

11. The process of claim 8 in which the water immiscible solvent is trichloroethylene.

12. The process of claim 8 in which the plant material is green.

13. The process of claim 8 in which the water immiscible organic solvent is an alkane of from 5 to 10 carbon atoms.

14. The process of claim 13 in which the alkane is heptane.

15. The process of claim 13 in which the alkane is hexane.

References Cited in the file of this patent

UNITED STATES PATENTS

| | | |
|---|---|---|
| 2,798,025 | Spensley | July 2, 1957 |
| 2,827,456 | Holt et al. | Mar. 18, 1958 |

OTHER REFERENCES

"Journal Pharm. Soc. Japan," by Nishikawa et al., vol. 74, pages 1165–7 relied on (1954); Chemical Abstracts (1955), vol. 49, paragraphs 14, 785(d).